United States Patent
Albers

(10) Patent No.: US 10,976,070 B1
(45) Date of Patent: Apr. 13, 2021

(54) FOAM CORE DUCT SYSTEM PROTECTED BY METAL SLEEVES WITH INTEGRAL FLANGES

(71) Applicant: Albers Mechanical Contractors, Inc., St. Paul, MN (US)

(72) Inventor: Charles G. Albers, Goodhue, MN (US)

(73) Assignee: ALBERS MECHANICAL CONTRACTORS, INC., St. Paul, MN (US)

( * ) Notice: Subject to any disclaimer, the term of this patent is extended or adjusted under 35 U.S.C. 154(b) by 0 days.

(21) Appl. No.: 15/940,164

(22) Filed: Mar. 29, 2018

Related U.S. Application Data

(60) Provisional application No. 62/479,951, filed on Mar. 31, 2017.

(51) Int. Cl.
*F24F 13/02* (2006.01)
*F16L 23/14* (2006.01)

(52) U.S. Cl.
CPC .......... *F24F 13/0209* (2013.01); *F16L 23/14* (2013.01); *F24F 13/0245* (2013.01); *F24F 13/0263* (2013.01); *F24F 13/0281* (2013.01)

(58) Field of Classification Search
CPC ............... F24F 13/0209; F24F 13/0245; F24F 13/0263; F24F 13/0281; F16L 23/14
See application file for complete search history.

(56) References Cited

U.S. PATENT DOCUMENTS

| | | | | |
|---|---|---|---|---|
| 3,805,845 A | * | 4/1974 | Santoro | F16L 23/14 138/109 |
| 3,889,581 A | * | 6/1975 | Bray, Sr. | F16L 23/14 126/299 E |
| 4,288,115 A | * | 9/1981 | Sullivan | F24F 13/0209 285/363 |
| 4,304,427 A | * | 12/1981 | McCabe | F16L 23/14 160/381 |
| 4,328,981 A | * | 5/1982 | Greene, Jr. | F16L 23/14 138/160 |
| 5,450,879 A | * | 9/1995 | Toben | F16L 23/14 138/109 |
| 5,653,482 A | * | 8/1997 | Ficchi, Jr. | F16L 23/14 285/363 |
| 8,733,749 B2 | | 5/2014 | Lanciaux | |
| 9,114,579 B2 | | 8/2015 | Lanciaux | |

(Continued)

FOREIGN PATENT DOCUMENTS

| | | | | |
|---|---|---|---|---|
| EP | 2418338 A1 | * | 2/2012 | ......... F16L 55/0336 |
| FR | 2335779 A1 | * | 7/1977 | ............ F16L 23/14 |
| FR | 2335779 A1 | | 7/1977 | |

OTHER PUBLICATIONS

Haomei aluminiuma, luminium embossed sheet, http://embossed-aluminium.com. 2 pgs. viewed Mar. 13, 2017.

(Continued)

*Primary Examiner* — Craig M Schneider
*Assistant Examiner* — David R Deal
(74) *Attorney, Agent, or Firm* — Kagan Binder, PLLC

(57) ABSTRACT

This application relates to a duct system, including a duct section that includes a foam body having a first end face and a second end face, where the foam body defines a duct passage extending from the first end face to the second end face, and a sleeve that directly or indirectly covers the foam body, the first sleeve including a plurality of side walls, where at least one side wall has an integral end portion that is folded back to define at least a portion of an integral, peripheral coupling flange around an end face of the foam body.

15 Claims, 14 Drawing Sheets

(56) References Cited

U.S. PATENT DOCUMENTS

| | | |
|---|---|---|
| 2010/0089210 A1 | 4/2010 | Lanciaux |
| 2011/0194894 A1* | 8/2011 | Seraphinoff ........... F16L 23/026 403/338 |
| 2014/0261846 A1 | 9/2014 | Lanciaux |
| 2014/0271972 A1 | 9/2014 | Lanciaux |
| 2014/0290783 A1* | 10/2014 | Fanelli ................ F24F 13/0245 138/149 |
| 2014/0290836 A1 | 10/2014 | Lanciaux |
| 2015/0101697 A1* | 4/2015 | Duffy .................. F24F 13/0209 138/149 |
| 2016/0025371 A1* | 1/2016 | Parks .................... F16L 59/026 138/141 |
| 2016/0131389 A1 | 5/2016 | Lanciaux |
| 2016/0215997 A1* | 7/2016 | Carlyon .................... B32B 5/20 |
| 2016/0327305 A1* | 11/2016 | Yoskowitz ............. F16J 15/104 |
| 2016/0377315 A1* | 12/2016 | McKie .................... F24F 3/044 454/241 |

OTHER PUBLICATIONS

Dual-Tech Brochure, Pre-Instulated Air Distribution System, Brochure 6 pgs., 2014.

Dual-Tech. PTMDual-Tech®, Quote Submittal Sheet, 1 pg. Oct. 2014.

The Kingspan KoolDuct System, Technical Data Sheet, 3 pgs., Apr. 2016.

Ducts & Cleats, Quick Start Guide, the Kingspan KoolDuct System, 4 pgs., Jul. 2016.

Thermaduct, Outdoor Duct Solved, Quote Submittal Sheet, 1 pg., Mar. 2015.

Pro-Duct, Forged in Thermal Protection, Submittal, 2 pgs., Feb. 2017.

The Kingspan KoolDuct System, An Introduction, 8 pgs., Dec. 2014.

\* cited by examiner

Fig. 4
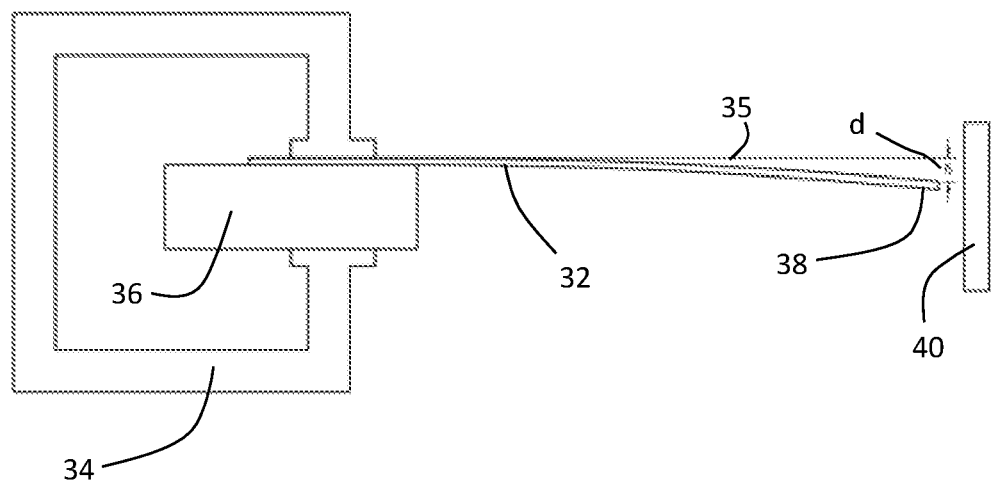
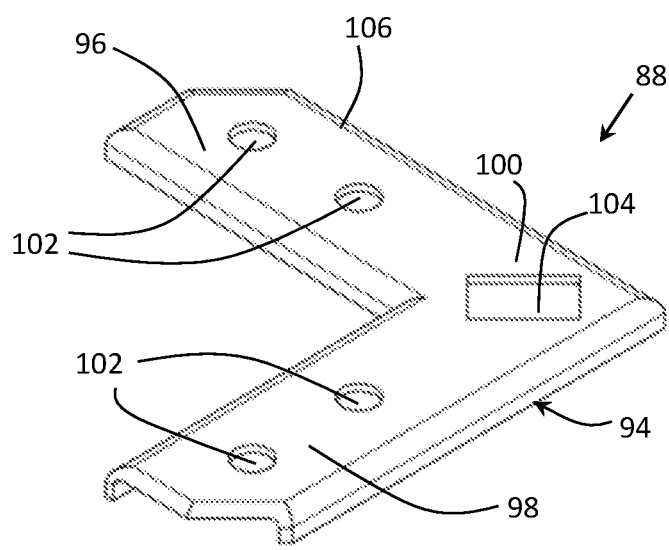
Fig. 5

FOAM CORE DUCT SYSTEM PROTECTED BY METAL SLEEVES WITH INTEGRAL FLANGES

CROSS-REFERENCE TO RELATED APPLICATIONS

The present application claims priority to U.S. Provisional Patent Application No. 62/479,951 filed Mar. 31, 2017, the entire contents of which is incorporated herein by reference it its entirety for all purposes.

FIELD OF THE INVENTION

The present invention relates to duct system components for HVAC applications that are made from foam panels that are enclosed within protective shells. More particularly, the present invention relates to such duct components in which flanges at each end of a duct section are integral with the protective shell.

BACKGROUND OF THE INVENTION

Duct systems are used in the field of heating, ventilation, and air conditioning (HVAC) to manage the intake, distribution, treatment, and exhaust of air in land and sea-based residential, industrial, commercial, and government applications. HVAC technology is used for vehicles, marine vessels, aircraft, spacecraft, buildings, and the like. A main goal of HVAC technology is to provide thermal comfort and acceptable air quality for people and/or machines. In some instances, HVAC technology is used to supply and exhaust air supplies at a point of use, such as in equipment that needs an air supply to properly operate.

Duct systems generally are assembled from several duct sections that are coupled together to provide one or more ducts through which air flows. Ducts made in whole or in part from sheet metal have been widely used for a long time. More recently, duct sections fabricated from foam panels have been used. Examples of foam-based duct sections are described in U.S. Pat. Pub. No. 2014/0261846 and U.S. Pat. Pub. No. 2016/0131389.

Duct systems fabricated from foam panels are commercially available. As one example, foam-based duct components are available under the trade designation KOOLDUCT from Kingspan Insulation, Ltd., a division of Kingspan Group PLC (headquarters in Kingscourt, County Cavan, Ireland). These components include a non-fibrous, rigid, thermoset core fabricated from a thermoset resin. The foam core is faced on both sides with 25.4 micron aluminum foil that is reinforced with a glass scrim. The foils are adhesively bonded to the foam core. As another example, foam-based duct components are available under the trade designation THERMADUCT from Thermaduct, LLC (Perrysburg, Ohio). These components are fabricated from the KOOLDUCT products that are fortified by adding additional cladding. In some embodiments, the KOOLDUCT products are clad in a 39 mil (1 mil=1/1000 inch) vinyl (believed to be polyvinyl chloride) shell. A smooth aluminum surface is used inside the duct pathway to mimic the frictional characteristics of sheet metal systems.

Another foam-based duct system is commercially from PTM Manufacturing, LLC, under the trade designation DUAL-TECH™. This system joins duct sections with fillers and connection plates using numerous screws. This system requires a considerable number of screws to assemble, with a corresponding large number of penetrations down into the duct bodies. Not only does this involve substantial labor for installation, the numerous penetrations increase the risk of moisture intrusion and associated issues. PTM Manufacturing, LLC also markets a duct system under the trade designation TECHNA-DUC™ involving interlocking, foam based panels. Another foam-based duct system is commercially available under the trade designation Q DUCT™ from AQC Industries. This system uses an interlocking male and female pocket design with a goal to create a thermal break with no through metal.

Duct systems fabricated from foam panels offer many advantages. Foam-based duct sections generally are much lighter in weight than sheet metal counterparts. This makes them easier to ship and handle than heavier sheet metal counterparts. Less load stresses are imposed on surrounding structures during the service life. Also, the foam-based duct sections are more rigid and more resistant to oil canning (i.e., a deflection of the sides of a duct). Foam-based duct sections are self-insulating as well with excellent watertight integrity. Foam-based duct systems also operate more quietly.

Conventional duct systems fabricated from foam panels unfortunately suffer from drawbacks. One drawback is that the shell materials used on commercially available systems are easy to dent or otherwise damage. The shell materials can suffer too easily from tears, dents, abrasions, and the like. Additionally, some of the shell materials are not sufficiently stable or durable enough for outdoor applications where systems are exposed to sunlight, blowing debris, hail, ice, and other damaging, environment elements. Some of the cladding strategies are quite expensive, making foam-based systems more expensive than conventional sheet metal systems. Also, some of the fastening strategies involve fastening coupling structures to or through the interior foam structure. The result is that these coupling structures penetrate deeply into the juncture between duct sections, allowing too much thermal or cooling losses. The separate coupling structures also add expense and manufacturing complexity, where an installation error could ruin an entire duct section as damage to foam cores might not be easily or cost effectively repaired. This approach for attaching coupling structures to the ends of duct sections can impose an increased risk of manufacturing yield losses. The conventional coupling structures also are quite heavy, undermining the light weight advantage that otherwise is inherent in using a foam-based product.

SUMMARY

The present invention provides improved, foam-based duct systems that are more easily and more cost effectively manufactured than conventional foam-based duct systems. The foam-based duct systems of the present invention provide a cost effective, highly durable shell to provide foam-based duct systems with more durability and resistance to damage. This enhanced protection helps to improve service life and durability performance in exterior and interior applications as well as to reduce the risk of other damage during shipping, installation, and use. An improved flange system also is provided that is easier to install, provides an excellent thermal break, and is light in weight. The duct systems also are characterized by high strength, low weight, and energy efficiency.

The present invention is based at least in part upon the concept of using robust, but cost-effective cladding materials that are sufficiently durable to allow integral flange components to be easily formed from the cladding material itself. The resultant flanges are strong, but still lightweight. The integral flanges project outward from the resultant protective shell to provide easily accessed flange surfaces to join duct sections together without needing any of the flange structure to penetrate into or through junctures between duct sections. An excellent thermal break is established that can avoid through metal penetration. Examples of metallic cladding include aluminum, stainless steel, galvanized steel, COR-TEN steel, combinations of these, or the like. Preferred surface texturing on metal cladding materials enhances durability and rigidity, allowing thinner gauge materials to be used that are still strong enough to serve as a source of the integral flange components. Manufacturing yields improve significantly because it is not necessary to risk damaging foam panels by bolting or otherwise attaching flange components to the face or inside of the foam core.

Embodiments of conventional foam-based duct systems are burdened by flange systems that wraps over the end faces of duct sections and then penetrate into the interior duct passage. These structures penetrate entirely from the exterior of the ducts down into the interiors. These full penetration approaches tend to allow substantial heat transfer through the junctures between duct sections. In some circumstances, this may cause undue amounts of condensation to occur inside a duct passage. Conventional systems with this problem have taken extra measures to protect against this problem, which is time consuming to install as well as more expensive. The integral flanges of the present invention provide a much more effective thermal break since the integral flanges project outward from the protective shell and need not penetrate wholly, or even partially in more preferred embodiments, through the juncture between duct sections. The present invention provides an improved thermal break between duct sections by avoiding undue penetrations into the interior of the duct system.

The integral flange system also is strong for at least four reasons. First, the integral flanges are coupled to the rest of the shell structure by an integral connection with high shear strength. Second, loads are more readily transferred far back into an associated side panel and/or side wall to help accommodate and dissipate flange stresses and other loading. Third, preferred embodiments further use Pittsburgh seam strategies to join seams of the protective shell to create very strong edges at wall junctures. The result is that duct systems of the present invention have improved ability to handle higher static pressure. Embodiments of conventional foam-based duct systems are rated to handle up to 4 inches to 6 inches of static pressure. The strength attributes provided by an integral flange system can handle 15 inches of static pressure or even higher in illustrative embodiments of the present invention. Fourth, the integral flanges also avoid penetrations that can lead to air and/or moisture intrusion.

In one aspect, the present invention relates to a duct system, comprising,
  a. a first duct section, the first duct section comprising:
    i. a first foam body having a first end face and a second end face, wherein the first foam body defines a first duct passage extending from the first end face to the second end face, and
    ii. a first sleeve that directly or indirectly covers the first foam body, said first sleeve comprising a plurality of side walls, wherein at least one side wall has an integral end portion that is folded back to define at least a portion of a first integral, peripheral coupling flange around an end face of the first foam body.

In another aspect, the present invention relates to a duct system, comprising,
  a. a first duct section, comprising:
    i. a first foam body having a first end face and a second end face, wherein the first foam body defines a first duct passage extending from the first end face to the second end face, and
    ii. a first sleeve that covers the first foam body, said first sleeve comprising a first plurality of side walls, wherein each side wall has an integral end portion that is folded back to define at least a portion of a first peripheral coupling flange around the first end face of the first foam body; and
  b. a second duct section, comprising:
    i. a second foam body having a third end face and a fourth end face, wherein the second foam body defines a second duct passage extending from the third end face to the fourth end face, and
    ii. a second sleeve that covers the second foam body, said second sleeve comprising a second plurality of side walls, wherein each side wall has an integral end portion that is folded back to define at least a portion of a second peripheral coupling flange around the third end face of the second foam body; and
  wherein the first peripheral coupling flange is coupled to the second peripheral coupling flange in a manner to join the first and second duct sections at a peripheral flange juncture such that the first duct passage is in fluid communication with the second duct passage and such that the duct passages are thermally isolated from the peripheral flange juncture.

In another aspect the present invention relates to a method of making a duct section, comprising the steps of:
  a. providing a first sleeve portion that comprises a first integral, folded end portion that is folded to form a first integral flange portion extending from the first sleeve portion;
  b. providing a second sleeve portion that comprises a second integral, folded end portion that is folded to form a second integral flange portion extending from the second sleeve portion;
  c. providing a foam body having a first end face and a second end face, wherein the foam body defines a duct passage extending from the first end face to the second end face; and
  d. using the first and second sleeve portions to form a sleeve around the foam body in a manner such that the first and second integral flange portions form at least a portion of a peripheral flange around the first end face of the foam body.

BRIEF DESCRIPTION OF THE DRAWINGS

FIG. 4 schematically illustrates a test methodology to measure flexural rigidity of a sheet or panel.

FIG. 5 shows a perspective view of a corner piece used in the duct section of FIGS. 1 to 3.

DETAILED DESCRIPTION OF PRESENTLY PREFERRED EMBODIMENTS

Figure 1:
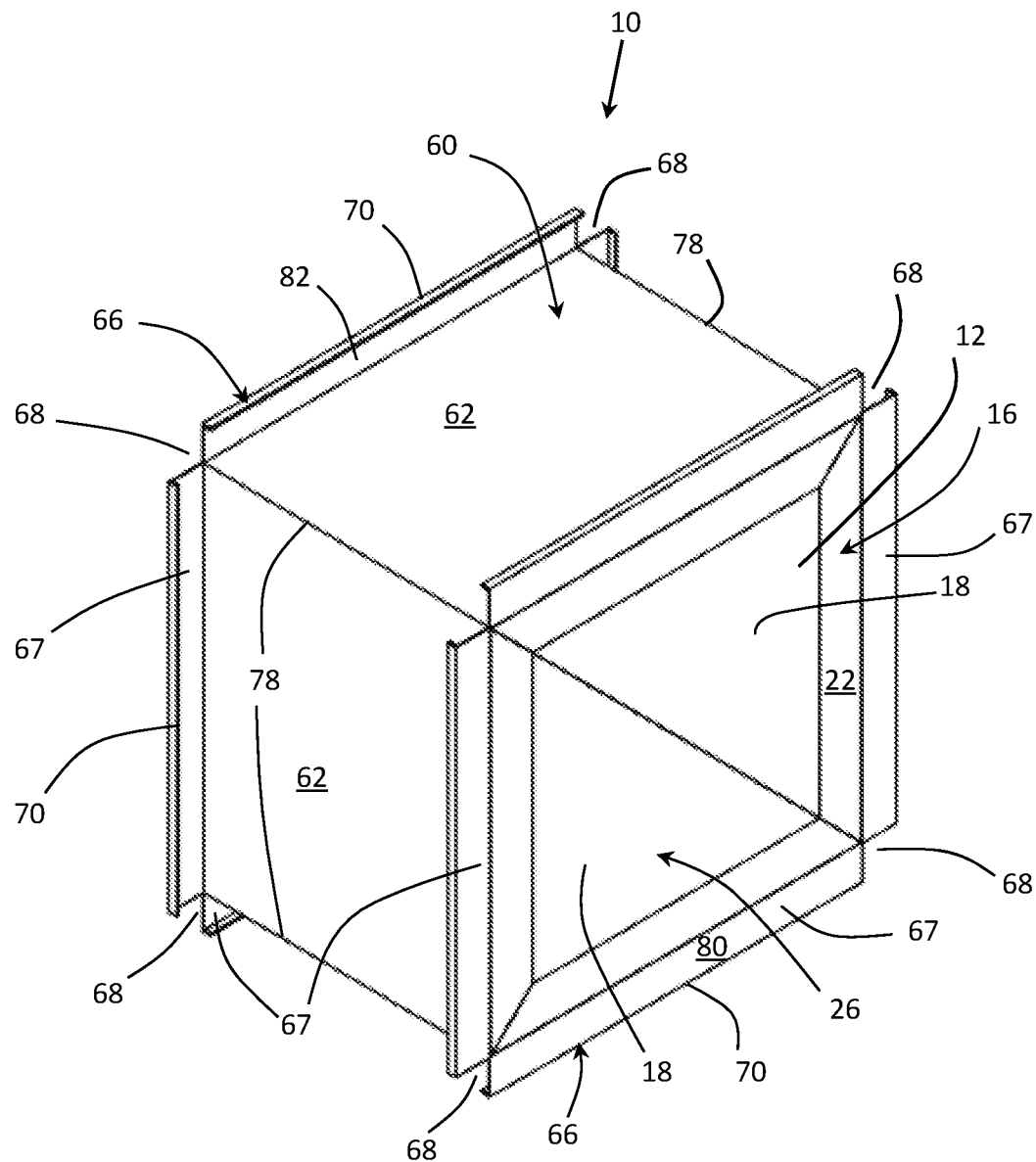
FIG. 1 shows a perspective view of a duct section of the present invention.
Figure 2:
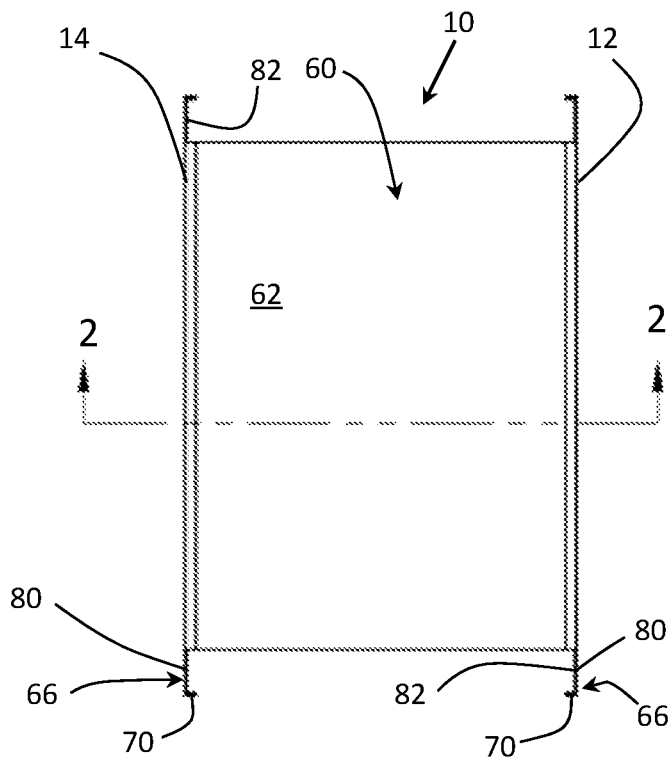
FIG. 2 shows a top view of the duct section of FIG. 1.
Figure 3:
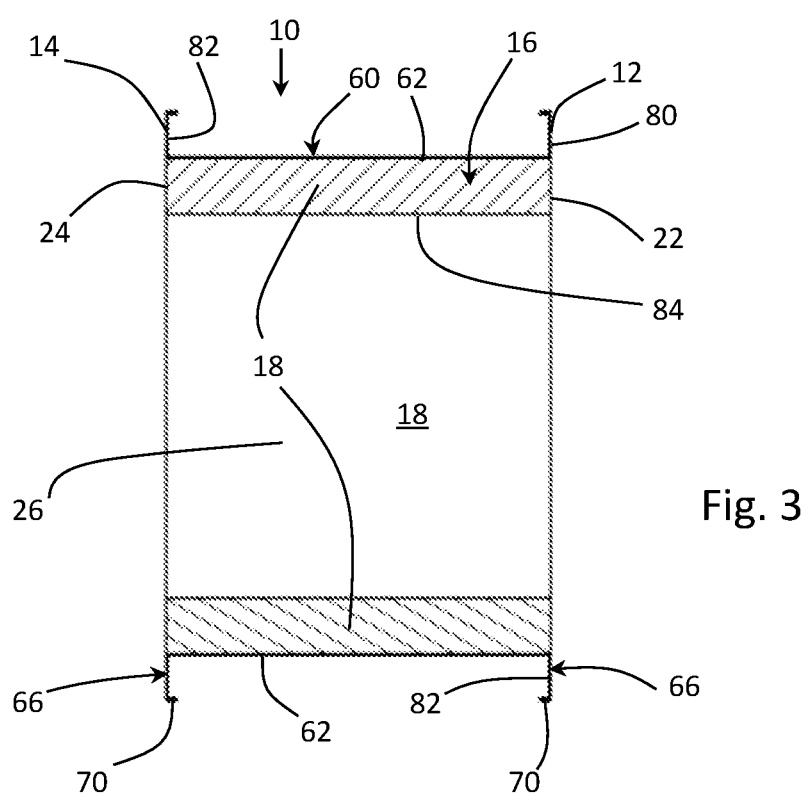
FIG. 3 shows a side cross-section view of the duct section of FIGS. 1 and 2 taken along line 3-3 of FIG. 2.

An exemplary embodiment of a duct section 10 of the present invention is shown in FIGS. 1 to 3. Duct section 10 generally extends from a first end 12 to a second end 14 and includes a foam body 16 and an external rigid sleeve 60. Foam body 16 includes side panels 18 defining a central duct 26 through which a fluid such as HVAC air flows when duct section 10 is installed as a component in an HVAC duct system. In many embodiments, side panels 18 are generally made from rigid foam panels having a thickness in the range from 0.5 inches to about 4 inches, preferably 1 inch to about 3 inches, more preferably about 1 inch to about 2 inches. The thickness of the side panels 18 provide foam body 16 with a first end face 22 and a second end face 24 that generally are co-extensive with first end 12 and second end 14. The thickness of the side panels 18 helps to provide duct section 10 with overall rigidity and strength while still allowing duct section 10 to be lightweight. The thickness also provides substantial thermal insulation between central duct 26 and the ambient.

The side panels 18 may be fabricated from a wide range of rigid foam materials. Illustrative foam materials may comprise open cell and/or closed cell foam. Closed cell foam is preferred. Illustrative foam materials may comprise thermoplastic or thermoset foam. Thermoplastic foam may be useful in embodiments where one or more of the side panels 18 are to be shaped with a geometry other than a flat panel shape. Thermoset foams generally are more preferred for their temperature, solvent, and strength characteristics. Phenolic resins, polyurethane, polystyrene, polyvinyl chloride, (meth)acrylic polymers, polyamides, polyimides, polyesters, combinations of these, and the like are examples of materials that are useful to make thermoplastic and/or thermoset foam materials.

Examples of foam materials useful in the practice of the present invention are commercially available from a variety of commercial sources in the form of foam panels, also referred to as foam board or foamboard. Some embodiments of such panels may be supplied with thin sheets applied to one or both major faces. In some embodiments, the side panels 18 include such a facing sheet only on the side of the panel corresponding to the external side of foam body 16. In other embodiments, the facing sheet may be placed on the face of the foam panel corresponding to the inside of foam body 16. In still other embodiments, such facing sheets may be placed on both faces of the panel corresponding to both the external side and inside of foam body 16. Techniques for converting a foam panel into foam bodies are described in U.S. Pat. Pub. Nos. 2014/0290836; 2014/0261846; 2014/0271972; and 2010/0089210; and U.S. Pat. No. 8,733,749.

Such thin sheets (not shown in FIGS. 1 to 3) may be made from a variety of materials including metals, metal alloys, cellulosic sheets (e.g., paper, cardboard, or resin impregnated versions of these), and/or one or more polymers. One or more thermoplastic and/or thermosetting polymers suitable for the facing sheets include one or more of phenolic resins, polyurethane, polystyrene, polyvinyl chloride, (meth)acrylic polymers, polyamides, polyimides, polyesters, combinations of these, and the like. One embodiment of a facing sheet comprises an aluminum foil. Another embodiment of a facing sheet comprises a polyvinyl chloride polymer. Such facing sheets, if present, may have a range of thicknesses. For example, a suitable thickness may be in the range from 0.2 mm to 3 mm.

With respect to the side panels 18, illustrative examples of foam panels suitable in the practice of the present invention are commercially available under the trade designation KOOLDUCT from Kingspan Insulation, Ltd., a division of Kingspan Group PLC (headquarters in Kingscourt, County Cavan, Ireland). The KOOLDUCT panels are rigid panels containing a thermoset, phenolic foam panel as a core. Thin aluminum foil sheets (25.4 microns) reinforced with a glass scrim (5 mm) are bonded to the major faces of the foam. The panels may be obtained in thicknesses including ⅞ inches, 1³⁄₁₆ inches, and 1⁵⁄₁₆ inches. The panels are supplied in widths of 4 feet and lengths of 10 and 13 feet. U.S. Pat. Pub. No. 2014/0290836 describes methods for using the KOOLDUCT panels to form duct-shaped assemblies suitable for use as foam body 16 in duct section 10.

The rigid sleeve 60 covers foam body 16. The sleeve 60 can serve many functions. As one function, sleeve 60 provides a protective shell to protect foam body 16 from impacts, abrasion, chemicals, sunlight, and other hazards of the ambient that might pose undue risk of damage or degradation to the foam body 16. Sleeve 60 also includes integral, self-supporting flange features (described further below) that allow duct section 10 to be physically coupled to other structures, including but not limited to other duct sections.

The ability to provide integral flanges is a significant feature with several advantages. This makes duct section 10 faster and easier to manufacture than many prior art approaches that attempt to couple flange structures to foam-based duct components. The integral flange features help to maintain the lightweight character of the duct section 10, easing both manufacture, installation, and use. Importantly, using integral flange features formed from the shell material itself means that little if any of the flange structure needs to penetrate into or between the foam bodies of the assembled duct sections. This allows for a strong thermal seal to be formed between duct sections, because penetrating metal flange features could be a significant source of heat conduction from or into the central duct 26. Sleeve 60 also provides a stable, rigid substrate to carry graphics, color or other indicia to enhance its visual appearance or convey words or visual information to viewers.

The integral flange system can also provide significant strength advantages. First, the integral flanges are coupled to the rest of the shell structure by an integral connection with high shear strength. Second, loads are more readily transferred far back into an associated side panel to help accommodate and dissipate flange stresses and other loading. Third, preferred embodiments further use Pittsburgh seam strategies to join seams of the protective shell to create very strong edges at panel junctures. The result is that duct sections and systems of the present invention have improved ability to handle higher static pressure. Embodiments of conventional foam-based duct systems are rated to handle up to 4 inches to 6 inches of static pressure. The strength attributes provided by an integral flange system handle 15 inches of static pressure or even higher in illustrative embodiments of the present invention.

In the practice of the present invention, more preferred embodiments of the sleeve 60 are fabricated from sheet or panel material that has greater flexural rigidity than is typical of metal foils or polymer facing sheets. The result is that the sleeve 60 has a sufficient thickness and rigidity to provide protection and enhance the structural stiffness and strength of duct section 10. Flexural rigidity refers to the resistance offered by a structure while undergoing bending forces.

The flexural rigidity of a material in the practice of the present can be determined with respect to the methodology schematically illustrated in FIG. 4. The test is carried out at 24° C. to 26° C., a relative humidity under 90% in ambient air at a pressure in the range from 12 psia (absolute psi, i.e., psi that is measured with respect to a vacuum) to about 15 psia. So long as a material is below its melting, boiling, or softening point, variation of temperature, pressure, or humidity within these ranges has a negligible effect upon the measured rigidity. A 14 inch by 12 inch specimen 32 of the sheet or panel to be tested is provided. Two inches of the longer length of the specimen is secured by clamps 34 to a flat, horizontal surface 36. The remaining 12 inch length is allowed to cantilever over the end of the surface to droop under the force of gravity. At the far end 38 of the specimen 32, the degree of drooping is given by the distance d by which the far end 38 droops from the horizontal reference 35 (shown by the horizontal dotted line which is aligned with the top surface of specimen 32 at the clamp location. The degree of dropping correlates to the flexural rigidity of the specimen 32. Generally, more rigid specimens show lesser drooping, while less rigid specimens show greater drooping. A sheet or panel is deemed to be rigid if the measured amount of drooping, d, of far end 38 of specimen 32 is 3 inches or less, preferably 2.5 inches or less, more preferably 2 inches or less, preferably 1 inch or less, even more preferably 0.5 inches or less.

Experiments were performed to evaluate the rigidity of sheet materials using the test procedure illustrated in FIG. 4. An aluminum sheet embossed with a stucco texture and having a thickness of 0.032 inches showed a deflection, d, of only 0.1875 inches. This sheet is a preferred cladding material to use to form at least a portion of sleeve 60. Such a sheet forms a highly protective, rigid, strong sleeve and integral flange structure in the practice of the present invention. A 26 gauge galvanized steel sheet having a thickness of 0.022 inches showed a deflection, d, of 1.9375 inches. To provide greater rigidity, if desired, a thicker galvanized steel sheet could be used, if desired, although such a sheet would be heavier than the much stiffer and lighter aluminum cladding bearing the embossed stucco texture. In contrast to such relatively rigid sheet materials, a thicker vinyl sheet having a thickness of 0.0394 inches was much more flexible, showing a deflection of 4.00 inches in the test of FIG. 4. Such a sheet would form weaker sleeve structures with less ability to provide strength and rigidity or handle loads if used in a duct section by itself.

Sleeve 60 comprises a plurality of side walls 62. Preferably, side panels 62 are formed from metallic materials that are rigid under the test of FIG. 4A. "Metallic" means that the side panels 62 comprise one or more metals, metal alloys, intermetallic compositions and/or composites comprising one or more of these. A significant advantage of these metallic panels is that they are structurally strong, allowing strong flange features to be integrally formed from portions of the side panels. The metallic side walls 62 also provide a significant contribution to the overall structural strength of the duct section 10. Integral side walls 62 formed from metallic constituents also easily and deeply accept loads transferred from the flange constituents. Such side walls 62 also are durable, thereby helping to provide excellent abrasion, impact, and other protection to the underlying foam body 16.

Preferably, at least one and more preferably all of these side walls 62 comprise a surface textured, rigid aluminum panel. Although aluminum is preferred, any metallic material used in sleeve 60 may include surface texture. The surface texture of the panels contributes to their rigidity, as the textured panels have greater rigidity than otherwise identical panels that have no texture. The surface texture also reduces glare and reflection. The aluminum has excellent suitability for both interior and exterior applications. The aluminum has excellent stability against corrosion, making duct section 10 suitable for environments exposed to humidity in saltwater environments. Textured aluminum sheets are more resistant to oil canning and dents. Aluminum is easily embossed using inexpensive techniques such as roller embossing. Textured aluminum sheets are cost effective, being available from multiple commercial sources. Aluminum sheets may be supplied in flat panels or in coils. Many embodiments of suitable aluminum sheet or wall materials are referred to in the industry as aluminum cladding. All or a portion of the aluminum optionally may be anodized.

Metallic walls may be provided with a wide variety of regular and/or irregular surface texture(s). For example, aluminum may be textured with shallow striations or grooves that or linear, curvilinear, zig zag, or the like. Such striations or grooves may optionally overlap each other to provide a regular or irregular grid of striations or grooves oriented in multiple directions. Other embossed patterns include dimples, orange peel, stucco, rhombic, diamond shaped, five rib configuration, and the like. Aluminum sheets with stucco embossing patterns are presently preferred. These embodiments are available in coils for easy shipping from several supply sources. Aluminum cladding is available in many color options, eliminating if desired a further need to apply a further finish or color to the resultant sleeve 60. Procuring pre-colored material saves the manufacturing time and expense needed to apply a finish during fabrication of duct section 10. Graphic sheets with images, words, or other indicia are easily attached to the aluminum.

Metallic sheet or side wall 62 material may have a wide range of thicknesses. In many embodiments, metallic sheets or panels have a thickness in the range from 0.2 mm to 4 mm, preferably 0.3 mm to 2 mm, more preferably 0.4 mm to 1 mm.

Sleeve 60 includes a plurality side walls 62, wherein at least one of the side walls 62 includes an integral end portion 67 that is folded back to define a portion of at least one peripheral coupling flange 66 around at least one of the first and second end faces 22 and 24 of foam body 16. In the embodiment of duct section 10 as illustrated in FIGS. 1 to 3, each side wall 62 includes integral end portions 67 that are folded back to provide portions of the peripheral coupling flanges 66 at each of the first and second end faces 22 and 24.

The strategy of using integral end portions 67 to form the flange components provides many advantages. First, this makes the flange easy to manufacture by simply folding or bonding the stock material used to form sleeve 60 (an illustrative fabrication technique is described below). Further, this allows a major portion and more preferably substantially all of the resultant flanges 66 to be coupled to the sleeve 60 on the outside of the foam body 16 without requiring or needing any flange components to penetrated into or through the foam. This is contrasted to prior art approaches in which separate flange components are attached to foam end faces both on the exterior and interior of the foam body by through bolts or other fixtures to secure the flange components in place. Because metal is a good thermal conductor, and because industry practice commonly uses metal materials to fabricate and secure the flanges, the conventional approach provides a juncture between duct sections that can allow significant heat transfer between central duct 26 and the ambient. Without requiring or needing any such penetrations through the foam body 16 or through the juncture between duct sections, the thermal barrier of the present invention between the central duct 26 and the ambient is more thermally robust with much less heat transfer at the junction. In the practice of the present invention, thermally conductive penetrations at the juncture between duct sections can be minimized and even entirely avoided.

Figure 6:
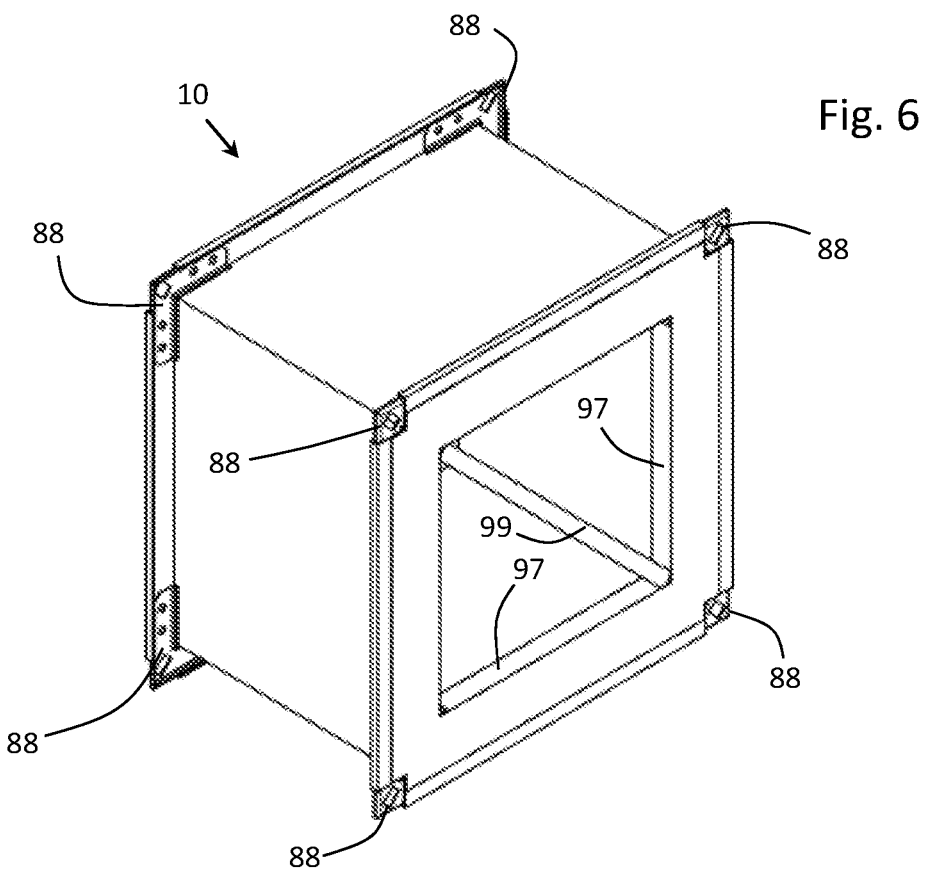
FIG. 6 shows a perspective view of the duct section of FIGS. 1 to 3 with corner pieces of FIG. 5 clamped (clamps not shown) in place to complete the peripheral flanges.
Figure 7:
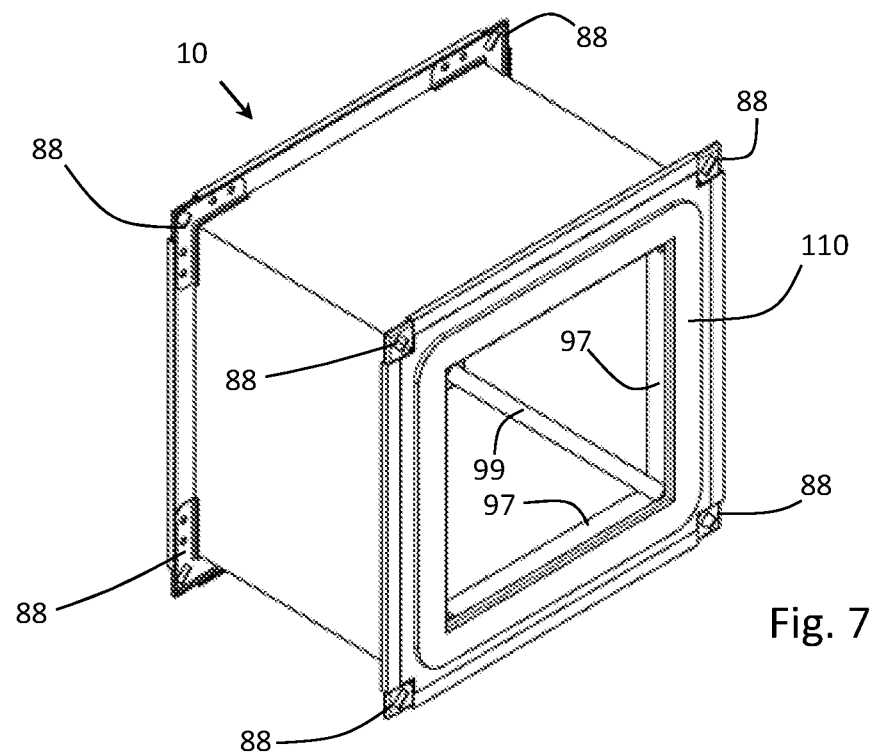
FIG. 7 shows a perspective view of the duct section of FIG. 6 further including gaskets to help provide a tighter seal when the duct section is attached to another duct section (not shown).

Open corner regions 68 result at the corners between adjacent end portions 67. FIGS. 5 to 7 below show how these regions are filled with corner pieces 88 to complete and further strengthen the flanges 66. Still referring to FIGS. 1 to 3, the folded end portions 67 generally have a front side 80 facing outward from duct section 10 and a back side 82 facing inward. As an option, the outer edges 70 of the flanges 66 may receive an edge treatment that facilitates the attachment of other duct system components as described below.

Sleeve 60 is positioned outside foam body 16. Optionally, an interior barrier lining 84 may line all or a portion of the inside of foam body 16.

FIG. 5 shows an illustrative embodiment of a corner piece 88 that can be used to help form the flanges 66. Corner piece 88 has an L-shaped body 94 with first leg 96 and second leg 98. Base region 100 includes a hole 104 that allows adjacent duct sections to be secured together by a suitable fastener such as a rivet or bolt, washers, and nuts. Legs 96 and 98 include optional apertures 102 that allow corner piece 88 to be attached to end portions 67 by suitable fasteners, if desired. Other securement techniques may be used, if desired. Outer edges 106 may be suitable shaped with a complementary geometry to edges 78 of end portions 67 to allow easier registration of corner piece 88 during installation.

FIG. 6 shows how corner pieces 88 are attached to end portions 67. The corner pieces 88 are attached to the backsides 82 of the end portions 67. Once installed, corner pieces 88 connect end portions 67 together to form flanges 66. Corner pieces 88 stabilize the shape of flanges 66, making them stronger and more rigid. Corner pieces 88 also provide a way to connect duct section 10 to other duct sections (which can be similar to duct section 10, for example). Tapes 97 cover the end faces 22 and 24 of foam body 16, and caulk 99 seals the corners inside foam body 16.

FIG. 7 shows that duct section 10 is further fitted with one or more gaskets 110 around the front side 80 of flanges 66. For purposes of illustration, a single gasket 110 is shown. The gasket 110 helps to provide an air and thermally tight seal between duct section 12 and another duct section when the two sections are connected together.

Figure 8:
FIG. 8 shows flat metal sheets used to fabricate sleeve portions used in the sleeve of FIGS. 1 to 3.

FIGS. 8 to 12 show an illustrative method to fabricate duct section 10. In FIG. 8 cladding sheets 120 and 122 of a surface textured, aluminum cladding material, such as aluminum cladding with an embossed stucco finish, are provided. Each cladding sheet 120 and 122 can be flat and can be processed to provide corresponding sleeve portions that will then be assembled to form a completed sleeve 60 of FIGS. 1 to 3.

Figure 9:
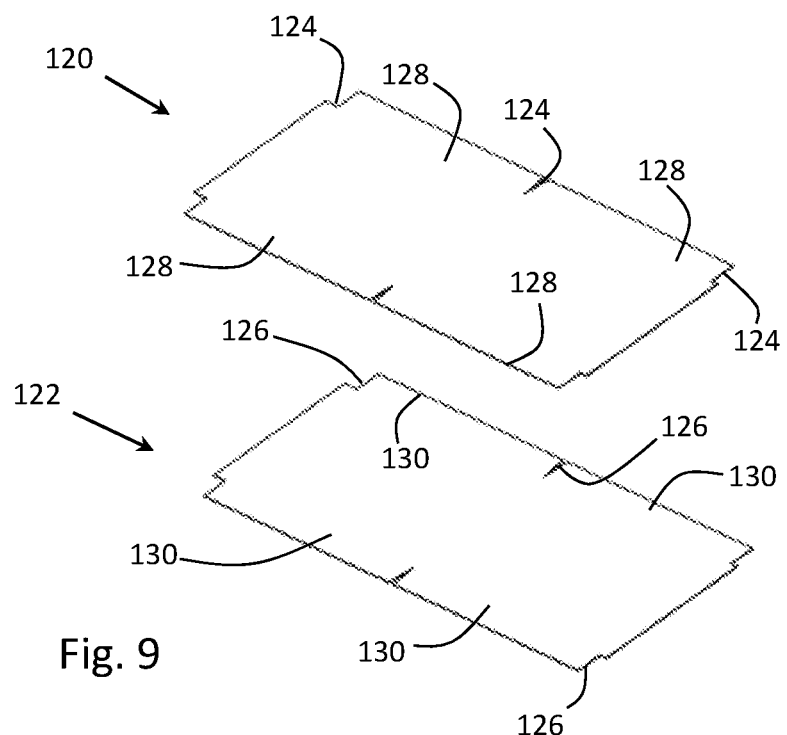
FIG. 9 shows an example of how cuts are made to define integral flange portions in the sheets of FIG. 9.

FIG. 9 shows cuts 124 and 126 being made in each cladding sheet 120 and 122. The cuts 124 and 126 help to define flange precursor regions 128 and 130 in the two cladding sheets 120 and 122. The flange precursor regions 128 and 130 can then be processed, such as by folding back or bending over or the like, for example in an opposite direction than the cladding sheets 120 and 122 will be folded at fold lines 140 and 142, respectively. At this stage of fabrication, flange precursor edges 132 and 133 optionally may be processed, such as by rolling over or the like. This can be done for a variety of reasons such as to help stiffen these regions, to provide a way to registrably connect these regions with corner pieces 88, and/or the like. Also at this stage, side edges 134 and 135 optionally may be processed, such as by rolling over, other shaping, or the like. This can be done for a variety of reasons such as to help stiffen the resultant sleeve portions as well as to provide edge features that help to connect the resultant sleeve portions together. For example, in some embodiments, the side edges 134 and 135 can be formed with complementary male and female Pittsburgh seam features that allow the edges of the resultant sleeve portions to be easily connected together. Pittsburgh seams are widely known and used in the HVAC industry for assembling duct system components.

Figure 10:
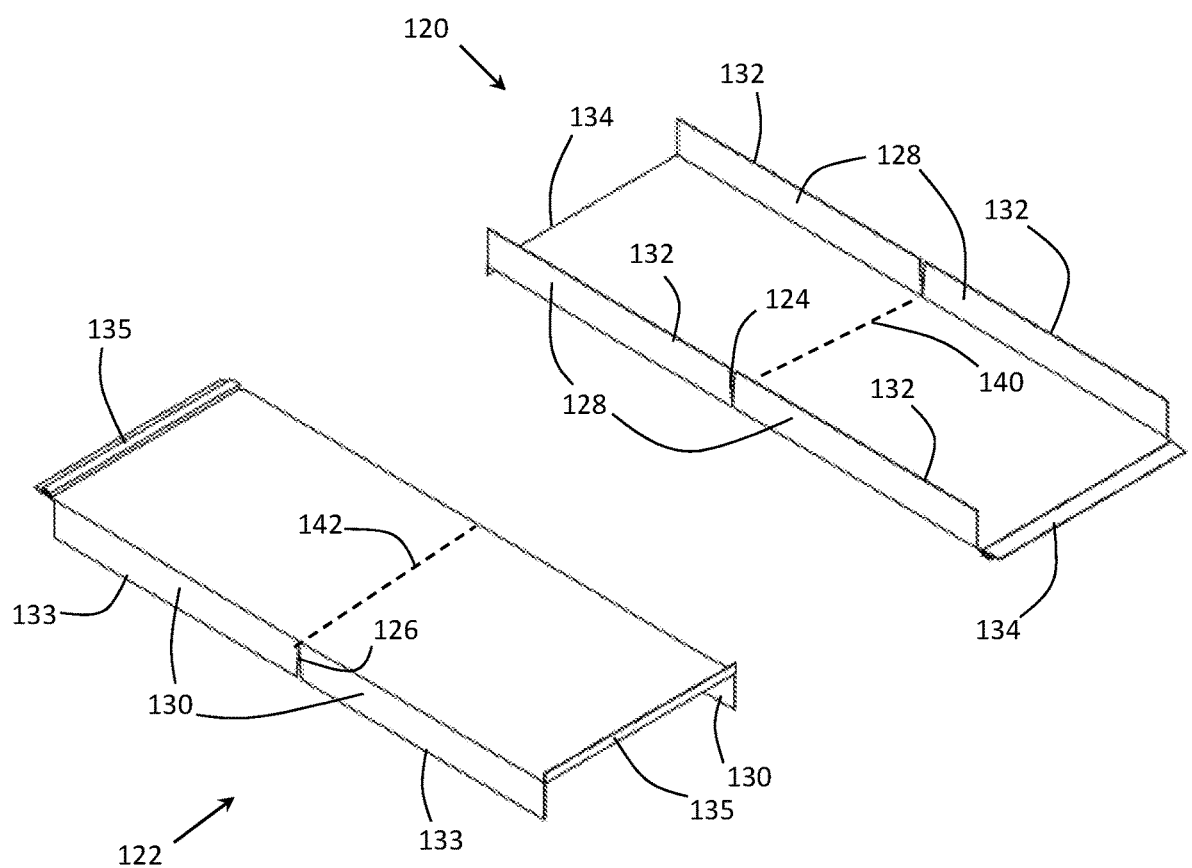
FIG. 10 shows an example of how the integral flange portions of FIG. 9 are folded.
Figure 11:
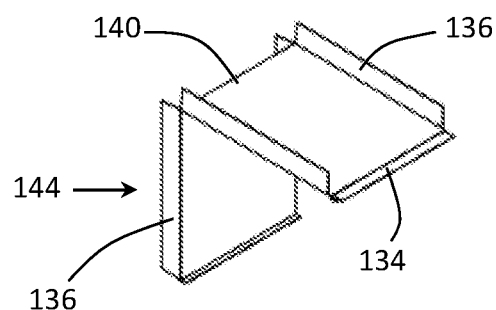
FIG. 11 shows an example of how the folded sheets of FIG. 10 are further processed to form two-sided sleeve portions.
Figure 12:
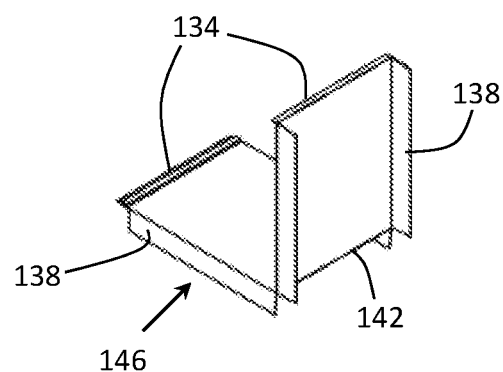
FIG. 12 shows how the two-sided sleeve portions of FIG. 11 are positioned around a foam body to be assembled to provide the duct section of FIGS. 1 to 3.
Figure 12:
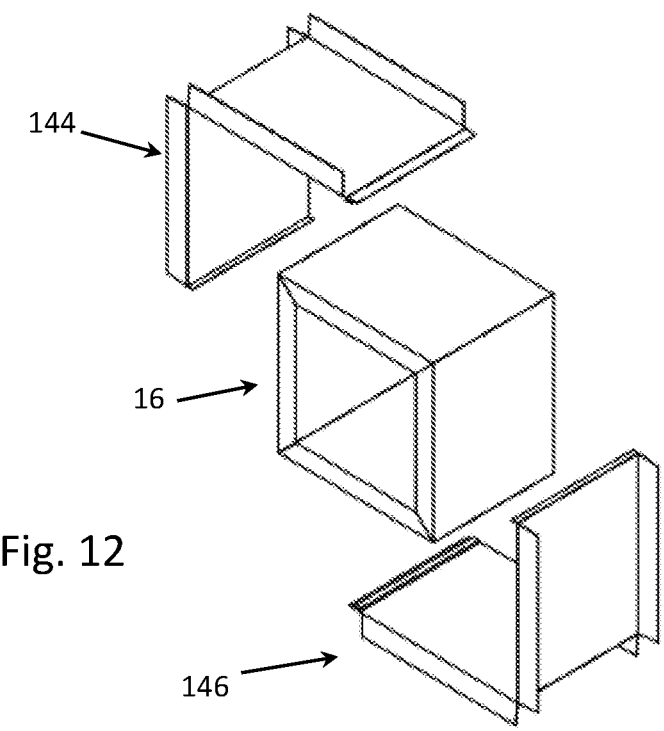

FIG. 10 shows how the flange precursor regions 128 and 130 can be folded back to form integral end portions 67 to provide a portion of the peripheral coupling flanges 66 to be formed at the ends of the resultant sleeve. Edges 134 and 135 also have been processed to include complementary Pittsburgh seam features. FIG. 11 shows how each cladding sheet 120 and 122 can be folded along bend lines 140 and 142 (shown schematically by dotted lines in FIG. 10) to form two-sided sleeve portions 144 and 146. FIG. 12 shows the sleeve portions 144 and 146 positioned around foam body 16 for assembly. These sleeve portions 144 and 146 can be fit around foam body 16 and joined at edges 134 and 135 to form the resultant sleeve 60 (FIGS. 1-3).

Sleeve portions 144 and 146 can be fit around foam body 16 with a friction or pressure fit. Alternatively, one or both sleeve portions 144 or 146 can be fixed to foam body 16 by a connection such as glue, screws, or other fastening techniques. If mechanical fasteners are used, desirably these only penetrate partly into foam body 16 in order to avoid provide a complete heat conduction path from the outside into the inside of the resultant duct section. If glue is used, glue can be applied to all or only selected portions of the outside of foam body 16 and/or corresponding mating faces of the sleeve portions 144 or 146. For purposes of illustration, foam body is provided with adhesive regions 148 on portions of the foam body 16 proximal to the end faces 22 and 24. This strategy provides a strong, fixed connection between the sleeve portions 144 and 146 and foam body 16 while unglued portions are still free to independently move to accommodate differential thermal expansion.

Upon assembly of sleeve portions 144, 146, and foam body 16, the duct section 10 of FIGS. 1-3 results. Duct section 10 is completed by adding corner pieces 88 and clamps 108, and gaskets 110, as shown in FIGS. 5 to 7.

Figure 13:
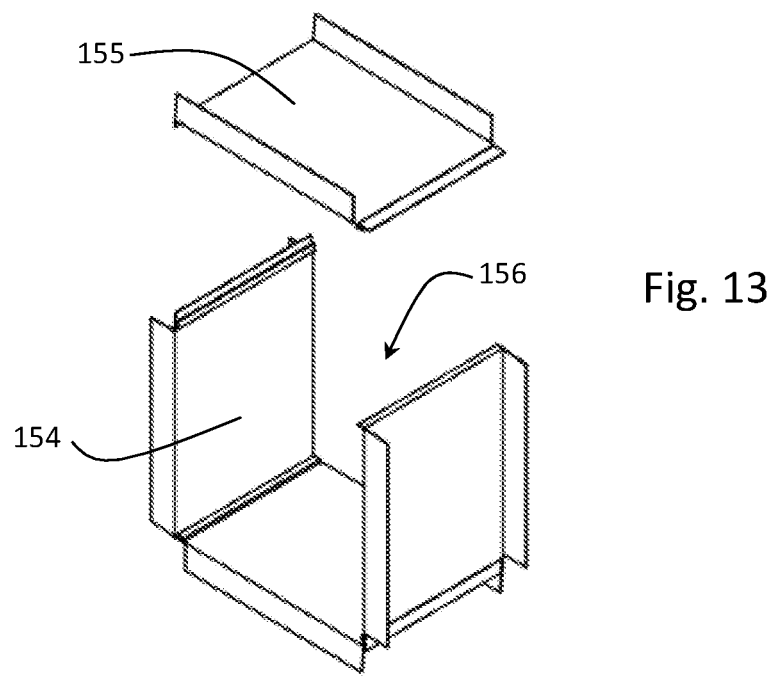
FIG. 13 shows an alternative embodiment of a sleeve portion that can be used to form a sleeve of the present invention.
Figure 14:
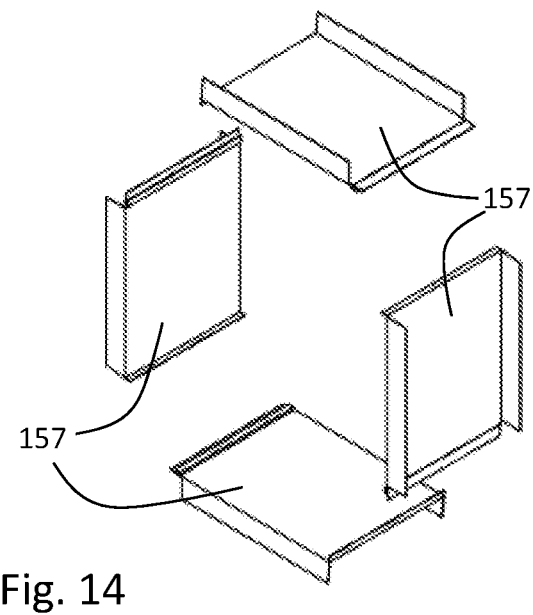
FIG. 14 shows an alternative embodiment of a sleeve portion that can be used to form a sleeve of the present invention.

FIGS. 8 through 12 show a methodology to fabricate a duct section from a pair of two-sided sleeve portions 144 and 146. Other fabrication strategies may be used. For example, FIG. 13 shows a three-sided sleeve portion 154 and a one-sided sleeve portion 155 being used to assemble a complete sleeve around a foam body. An advantage of this approach is that the three sided sleeve portion 154 provides a pocket 156 to easily hold the foam body 16 while the panel portion 155 is secured in place. FIG. 14 shows an alternative approach in which one-sided sleeve portions 157 are assembled and fit around a foam body to form a completed sleeve. This approach has an advantage when the sides of the foam body might not all be the same size, are curved or another non-rectilinear shape, or pose other assembly challenges for which individual fabrication of each side of the sleeve might be desired.

Figure 15:
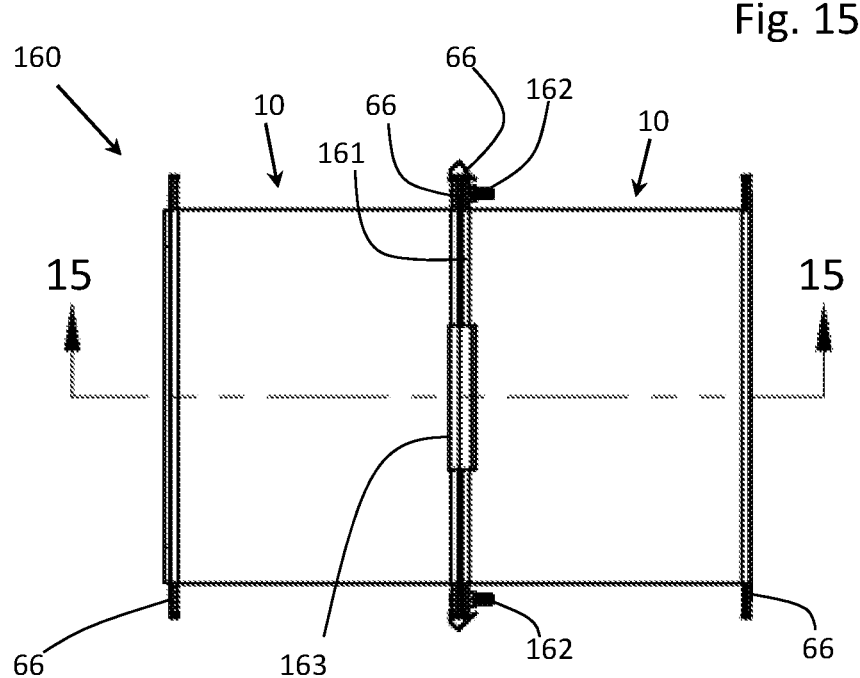
FIG. 15 shows a top view of two duct sections of FIGS. 1-3 and 6-7 coupled together.
Figure 16:
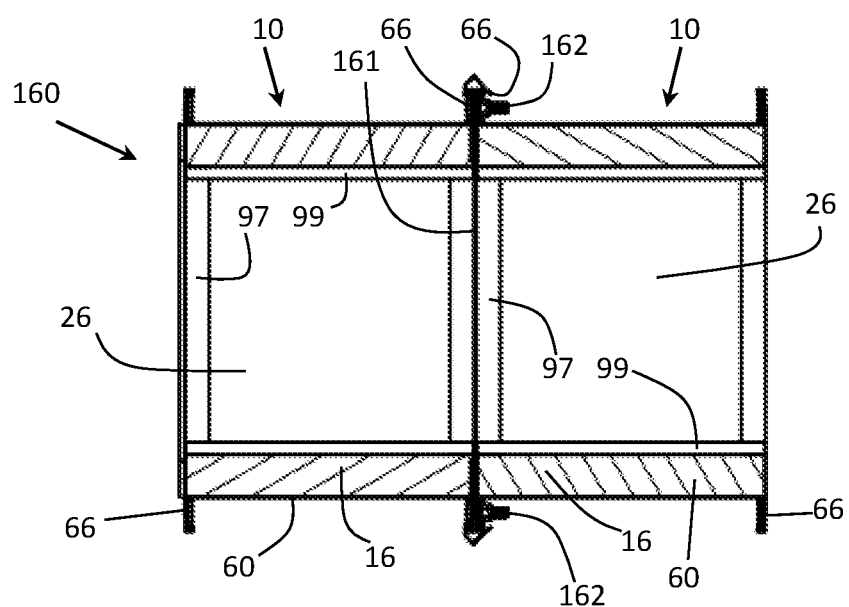
FIG. 16 shows a side cross section view of the assembled duct sections of FIG. 15 taken along line 15-15 of FIG. 15.
Figure 17:
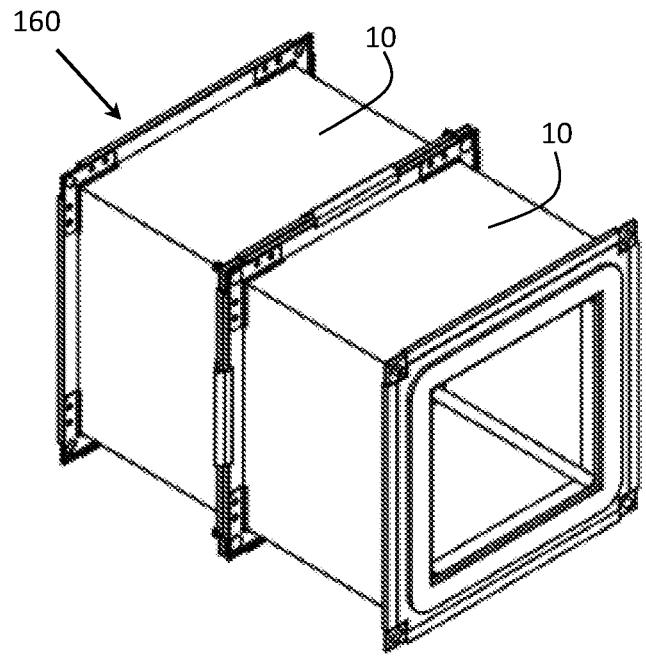
FIG. 17 shows a perspective view of the two ducts sections of FIG. 15 coupled together.

FIGS. 15 to 17 show how two duct sections 10 of FIGS. 1 to 3 can be joined to form a longer duct section assembly 160 at a juncture 161 between the two duct sections 10. Fasteners 162 in the form of bolts, washers, and nuts are used to connect the two duct sections 10 together. For example, the two duct sections 10 can be connected together using a flange clamp 163, which can be an example of a fastener 162. The duct sections 10 are joined together in a manner such that the central ducts 26 of each are in fluid communication. The central ducts 26 are thus joined to form one composite duct passage for smooth flow of HVAC air through them.

Figure 18:
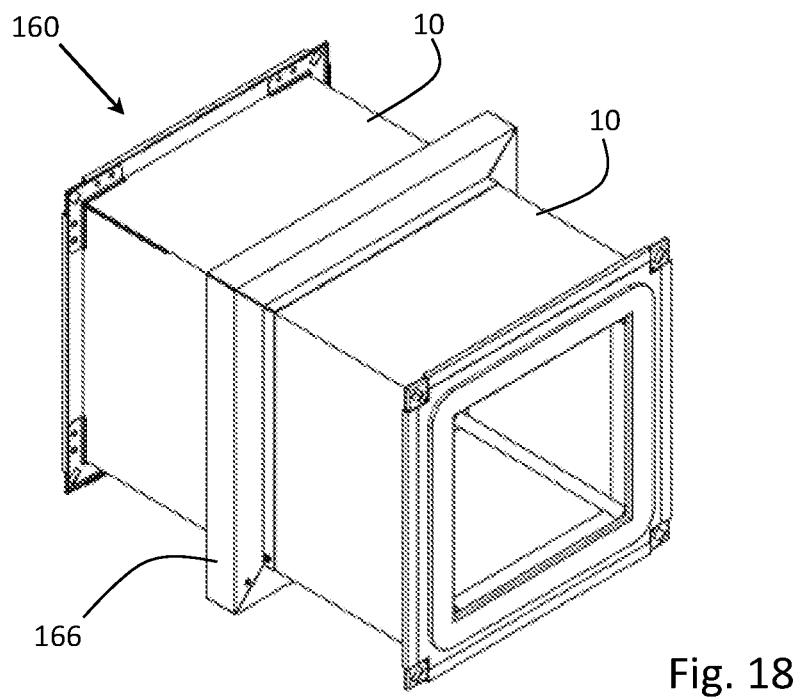
FIG. 18 shows the assembled duct sections of FIG. 15 with a cover over the juncture between the duct sections.

FIG. 18 shows the duct section assembly 160 optionally may be fitted with a cover 166 over juncture 161 to help protect the juncture 161 against rain, snow, hail, dust, wind, or other elements of the ambient. The cover 166 may be formed from one or more components. Cover 166 as shown covers the top and sides of juncture 161. Optionally, cover could extend to cover the bottom of juncture 161, but this is not required to adequately protect juncture 161.

Figure 19:
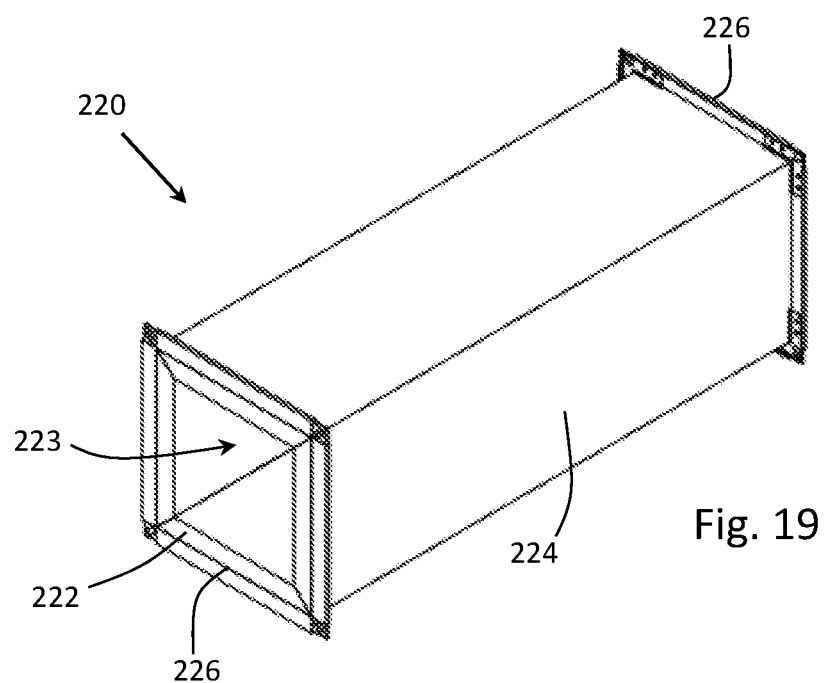
FIG. 19 shows an alternative embodiment of a duct section of the present invention.

FIG. 19 shows an alternative embodiment of a duct section 220 of the present invention that has a similar cross-section to duct section 10 of FIGS. 1 to 3, except that duct section 220 is longer. In illustrative embodiments, a longer duct section 220 may have a length up to about 14 feet or even up to about 20 feet. Longer spans than these are conveniently accommodated by using more than one duct section. Duct section 220 includes foam core 222 providing a central duct 223. Metallic shell 224 is provided on foam core 222 and is fitted with integral flanges 226.

Figure 20:
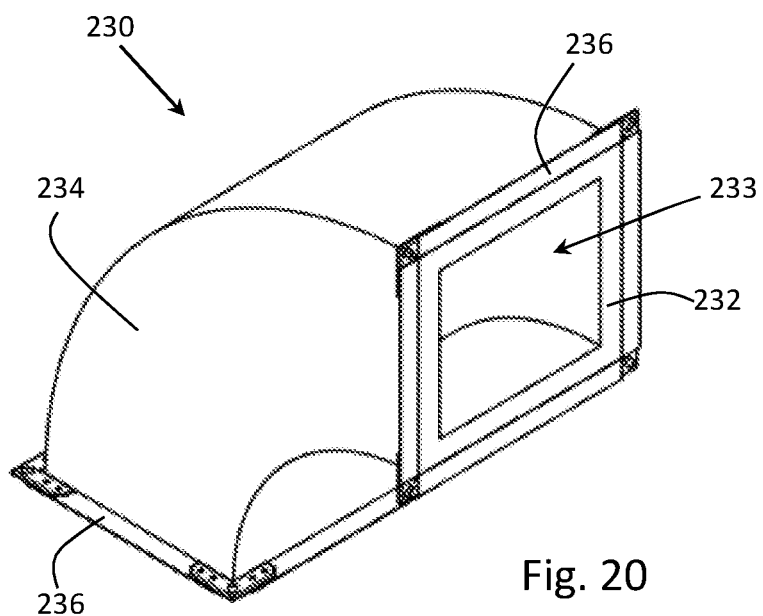
FIG. 20 shows an alternative embodiment of a duct section of the present invention.

FIG. 20 shows an alternative embodiment of a curved duct section 230 of the present invention. Duct section 230 includes foam core 232 providing a central duct 233. Metallic shell 234 is provided on foam core 232 and is fitted with integral flanges 236.

Figure 21:
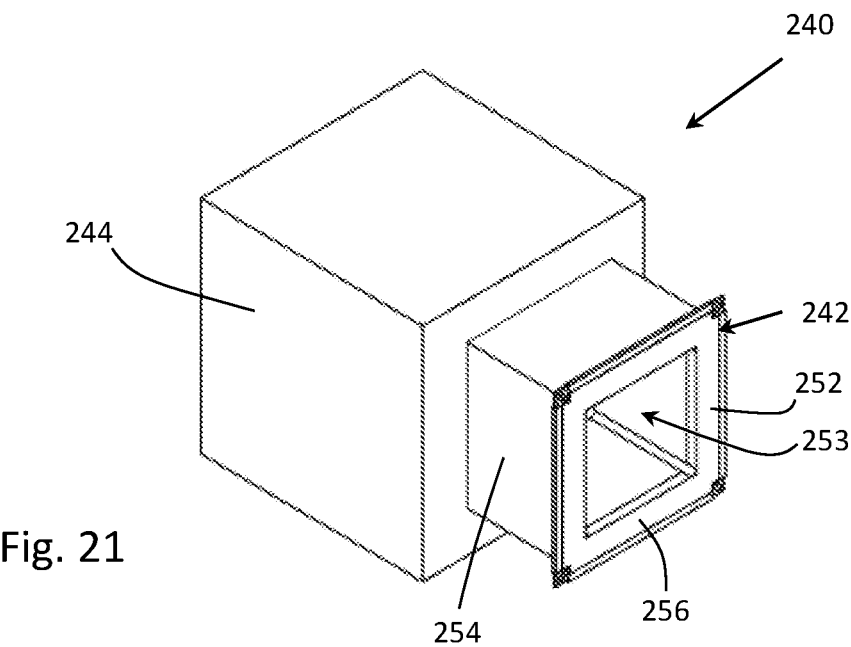
FIG. 21 shows a perspective view of an alternative embodiment of a duct section of the present invention.
Figure 22:
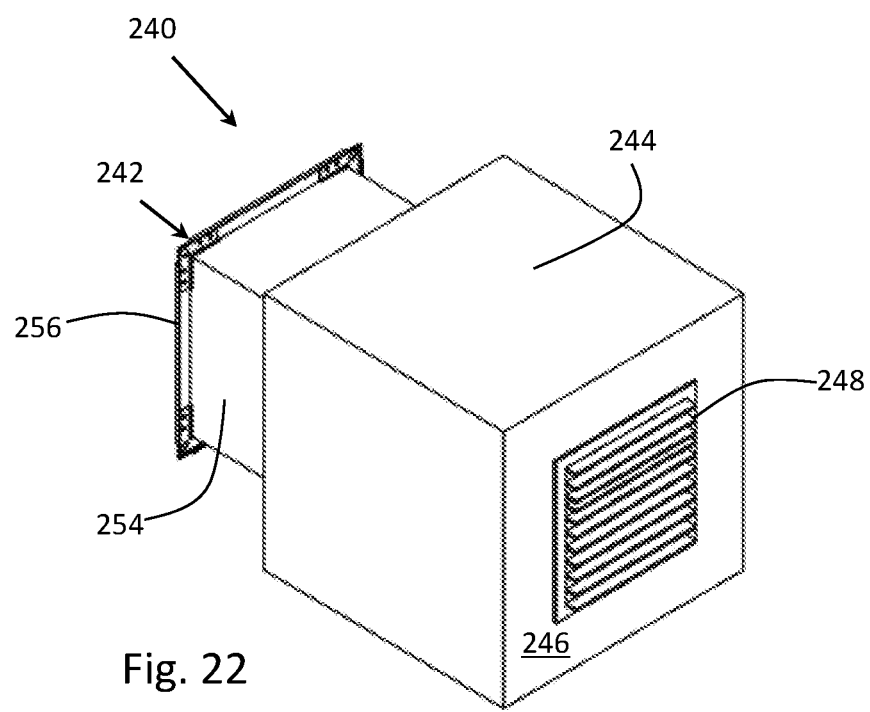
FIG. 22 shows an alternative perspective view of the duct section of FIG. 21.

FIGS. 21 and 22 show an alternative embodiment of an exhaust duct section 240 having plenum section 242 that connects duct section 240 to other ducts. Enlarged plenum 244 serves as an exhaust directly to the ambient. The face 246 of plenum 244 includes a louvered cover 248 through which exhaust air flows out of plenum 244. Plenum section 242 includes foam core 252 providing a central duct 253. Metallic shell 254 is provided on foam core 252 and is fitted with an integral flange 256.

Optionally, some embodiments of duct section 10 optionally may include structural members to help provide structural reinforcement. This is advantageous for relatively larger embodiments of duct section 10. One strategy for providing such reinforcement is described in U.S. Pat. Pub. 2016/0131389. This strategy involves supporting opposing walls with struts to help prevent the walls from bowing inward or outward. The struts are bolted to the opposing walls using wide plates at the mounting sites to help distribute forces over a wide area of the walls. The wide plates are positioned both inside and outside the walls.

Figure 23:
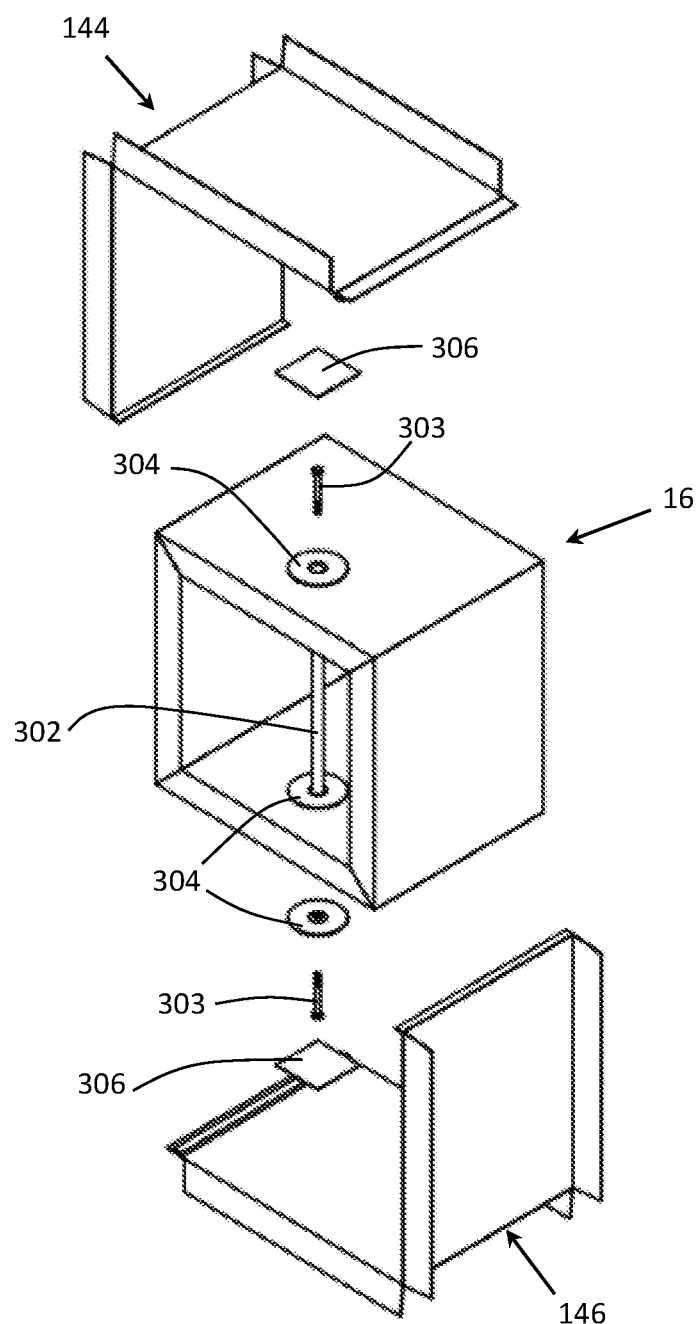
FIG. 23 shows how two-sided sleeve portions of FIG. 11 are positioned around a foam body to be assembled to provide the duct section of FIGS. 1 to 3 with structural reinforcement.
Figure 24:
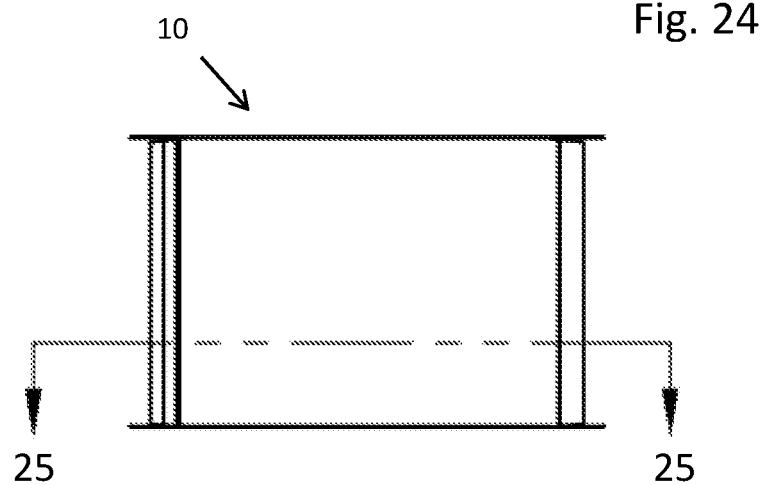
FIG. 24 shows a top view of the assembled duct section of FIG. 23.
Figure 25:
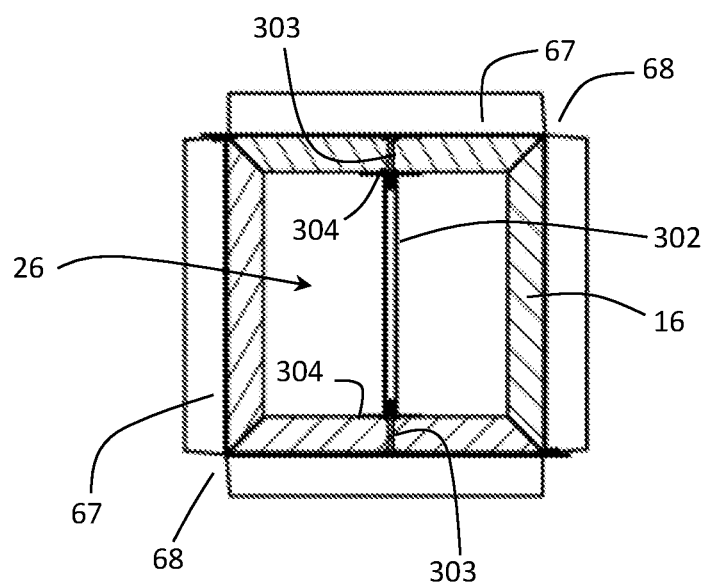
FIG. 25 shows a side cross-section view of the duct section of FIG. 24 taken along line 24-24 of FIG. 24.

Another strategy for using structural reinforcement in duct section 10 of FIGS. 1 to 3 is shown in FIGS. 23, 24, and 25. Each end of a reinforcing strut 302 is bolted to opposite side walls 18 of foam body 16. Bolts 303 threadably engage the ends of strut 302. Clamping plates 304 help to distribute the clamping load over a wider footprint on the foam body 16. Covers 306 are placed over the bolts 303 and external plates 304. In one embodiment, covers 306 are formed from insulating rubber sheets to help create a thermal barrier between the bolts 303 and plates 304 and the ambient. Sleeve portions 308 and 309 are then assembled over the structurally reinforced foam body 16 to form sleeve 60. The reinforcement structure is thus inside sleeve 60 in this embodiment. Bolts 303 can be threaded into the ends of strut 302 from outside sleeve 60 in other embodiments, although this may provide a direct heat conduction path completely through duct section 10.

The embodiments of the present invention described herein are not intended to be exhaustive or to limit the invention to the precise forms disclosed in the specification and Figures. Rather a purpose of the illustrative embodiments chosen and described is so that the appreciation and understanding by others skilled in the art of the principles and practices of the present invention can be facilitated. While illustrative embodiments of the present invention have been shown and described herein, the skilled worker will appreciate that such embodiments are provided by way of example and illustration only. Numerous variations, changes, and substitutions will now occur to those skilled in the art without departing from the invention. No unnecessary limitations are to be understood therefrom. The invention is not limited to the exact details shown and described, and any variations are included that are within the scope of the claims.

All patents, patent applications, and publications cited herein are incorporated by reference in their respective entireties for all purposes.

What is claimed is:

1. A duct system, comprising,
a first duct section and a second duct section, each of the first and second duct sections comprising:
1) a rigid foam body having a first end face and a second end face, wherein the rigid foam body defines a first duct passage extending from the first end face to the second end face,
2) a rigid, external sleeve that directly or indirectly covers the foam body, said sleeve comprising a plurality of side walls that fit around and cover the foam body, wherein each side wall has an integral, end portion that is folded back to project outward from a corresponding sidewall and from the end face of the foam body such that the folded back end portion is outside the foam body, wherein the folded back end portions of the side walls provide a first integral, peripheral coupling flange that is outside the first foam body, and wherein the folded back end portions are folded back such that the peripheral coupling flange has open corners between adjacent folded back end portions,
3) a plurality of L-shaped corner pieces attached to the peripheral coupling flange at each of the open corner regions in a manner effective to stabilize and make the peripheral coupling flange more rigid, each corner piece comprising a first leg attached to a first folded back end portion and a second leg attached to a second, adjacent folded back end portion, and a base portion in the open corner region between the first and second, adjacent folded back end portions, wherein the base portion comprises a base portion aperture that allows the base portion of the corner piece on one of the first and second duct sections to be fastened to the base portion of the corner piece on the other of the first and second duct sections; and
4) an interior barrier lining configured to line at least a portion of an inside of the rigid foam body.

2. The duct system of claim 1, wherein the rigid, external sleeve comprises a plurality of sleeve portions, wherein each sleeve portion of the plurality of sleeve portions comprises at least one side wall of the plurality of side walls.

3. The duct system of claim 2, wherein at least one side wall comprises one or more side edges configured to stiffen the rigid, external sleeve.

4. The duct system of claim 3, wherein the one or more side edges of the plurality of sleeve portions comprise edge features configured for connecting the plurality of sleeve portions together to form the rigid, external sleeve.

5. The duct system of claim 2, wherein the plurality of sleeve portions comprise a two-side wall sleeve portion and another two-side wall sleeve portion.

6. The duct system of claim 2, wherein the plurality of sleeve portions comprise a three-side wall sleeve portion and a one-side wall sleeve portion.

7. The duct system of claim 1, wherein the integral, peripheral coupling flange on the first duct section is attached to the integral, peripheral coupling flange on the second duct section outside the foam bodies of the first and second duct sections.

8. The duct system of claim 7, wherein the corner pieces of the first duct section are physically coupled to the corner pieces of the second duct section.

9. The duct system of claim 8, wherein the first and second duct sections are coupled to each other at a juncture without any portion of the peripheral flanges penetrating into or through the juncture.

10. The duct system of claim 1, wherein the side walls comprise rigid aluminum.

11. The duct system of claim 10, wherein the side walls comprise rigid aluminum having a surface texture.

12. The duct system of claim 10, wherein the each of the side walls has a thickness between 0.2 mm and 4 mm.

13. The duct system of claim 1, wherein:
the peripheral coupling flange of the first duct section is coupled to the peripheral coupling flange of the second duct section outside the first and second duct sections in a manner to join the first and second duct sections at a peripheral flange juncture without the peripheral coupling flanges penetrating into the flange juncture such that the duct passage of the first duct section is in fluid communication with the duct passage of the second duct section and such that the duct passages are thermally isolated from the peripheral coupling flanges at the flange juncture.

14. The duct system of claim 13, wherein at least one gasket is fitted around the first and second peripheral coupling flanges at the peripheral flange juncture, and wherein the at least one gasket is configured to help provide an air and thermally tight seal between the coupled first and second duct sections.

15. A method of making a duct section, comprising the steps of:
1) providing a first sleeve portion that comprises a first integral, folded end portion that is folded to form a first integral flange portion extending from the first sleeve portion;
2) providing a second sleeve portion that comprises a second integral, folded end portion that is folded to form a second integral flange portion extending from the second sleeve portion;
3) providing a foam body having a first end face and a second end face, wherein the foam body defines a duct passage extending from the first end face to the second end to the second end face, wherein the foam body further comprises an interior barrier lining configured to line at least a portion of an inside of the foam body;
4) using the first and second sleeve portions to form a sleeve around the foam body in a manner such that the first and second integral flange portions are adjacent and form at least a portion of a peripheral flange around the first end face of the foam body such that the first integral, peripheral coupling flange is outside the first foam body and such that there is an open corner region between the first and second integral flange portions; and
5) attaching an L-shaped corner piece to the first and second integral flange portions, said L-shaped corner piece comprising a first leg, a second leg, and a base portion having an aperture, said corner piece attached to the first and second flange portions such that the first leg of the corner piece is attached to the first integral flange portion, the second leg of the corner piece is attached to the second integral flange portion, and the base portion is positioned in the open corner region.

\* \* \* \* \*